United States Patent [19]

Thomas

[11] 4,177,939

[45] Dec. 11, 1979

[54] SQUEEZE BOTTLE

[75] Inventor: Ralph H. Thomas, Clark, N.J.

[73] Assignee: Bristol-Myers Company, New York, N.Y.

[21] Appl. No.: 817,958

[22] Filed: Jul. 22, 1977

[51] Int. Cl.² .............................................. B65D 1/32
[52] U.S. Cl. .................................. 222/153; 222/183; 222/214
[58] Field of Search ............... 222/183, 214, 173, 206, 222/153; 239/327

[56] References Cited

U.S. PATENT DOCUMENTS

| | | | |
|---|---|---|---|
| 3,223,289 | 12/1965 | Bouct | 222/214 X |
| 3,224,650 | 12/1965 | Willits | 222/214 X |
| 3,926,347 | 12/1975 | Low et al. | 222/214 X |
| 4,098,434 | 7/1978 | Uhlig | 222/105 X |

FOREIGN PATENT DOCUMENTS 1184993 2/1959 France ................................... 239/327

621769 6/1961 Italy ........................................ 239/327

Primary Examiner—Robert J. Spar
Assistant Examiner—Frederick R. Handren
Attorney, Agent, or Firm—Irving Holtzman; George A. Mentis; David J. Mugford

[57] ABSTRACT

In a squeeze bottle including a container having an upstanding neck portion and a spray unit in the neck portion through which product is dispensed from the container, the improvement comprising bellowed portions in the walls of the container and a compressible shroud surrounding the container walls. The shroud is formed of two sections, which are joined by a mating groove and bead arrangement on their edges and which substantially overlap each other when a squeezing pressure is applied to the shroud and a predetermined resistance of the groove and bead arrangement is overcome, so that the shroud sections compress the bellowed container walls and product is dispensed.

3 Claims, 20 Drawing Figures

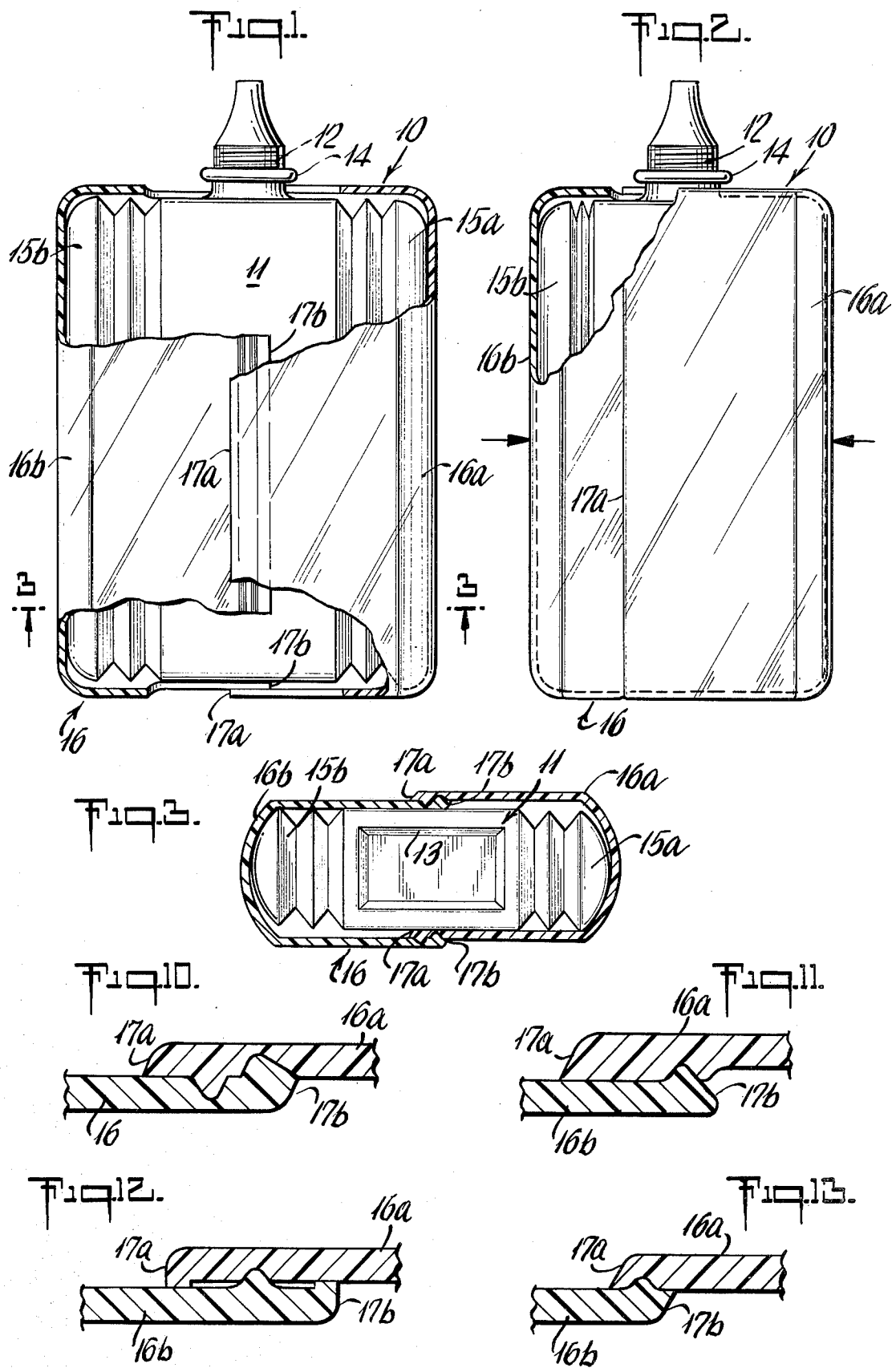

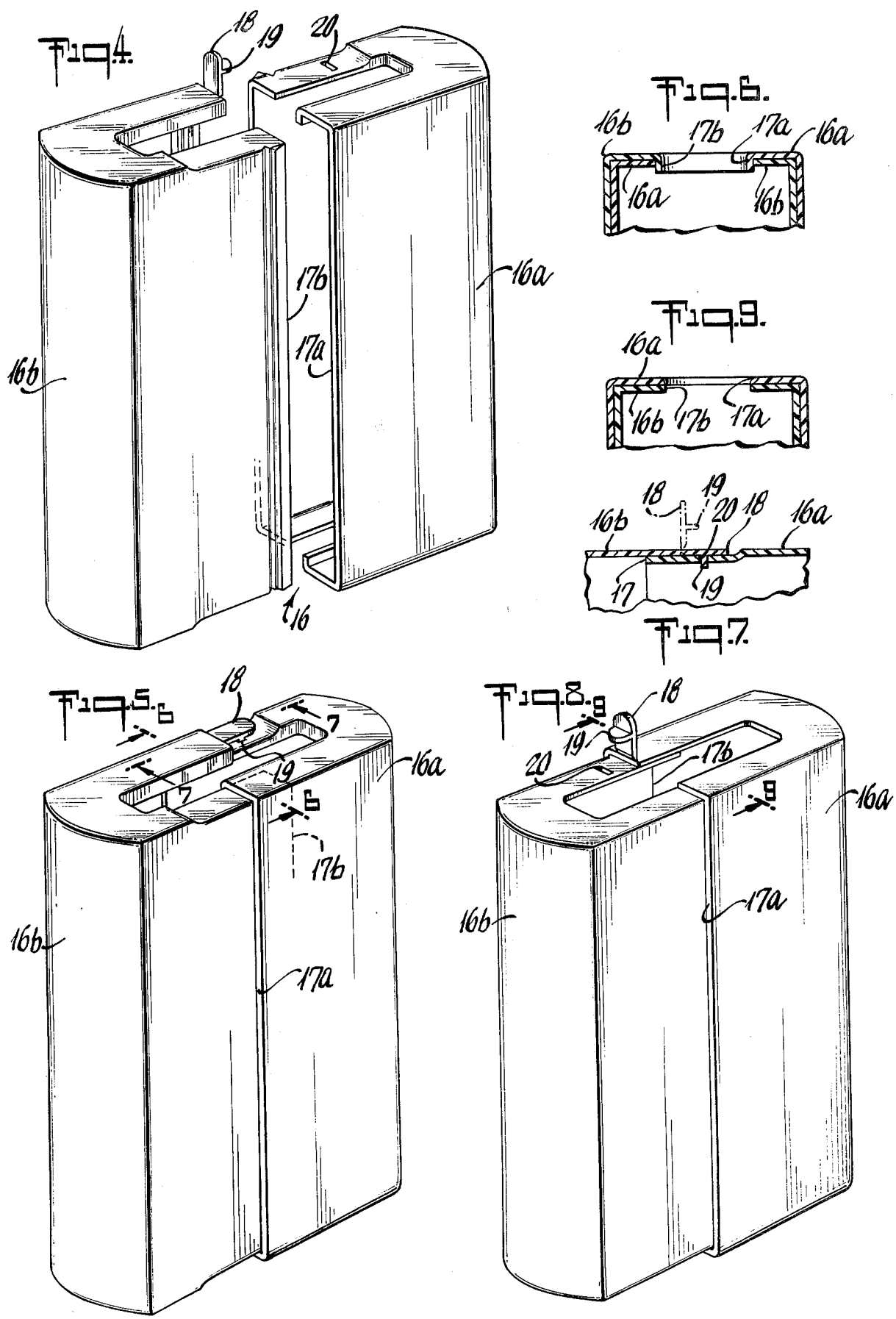

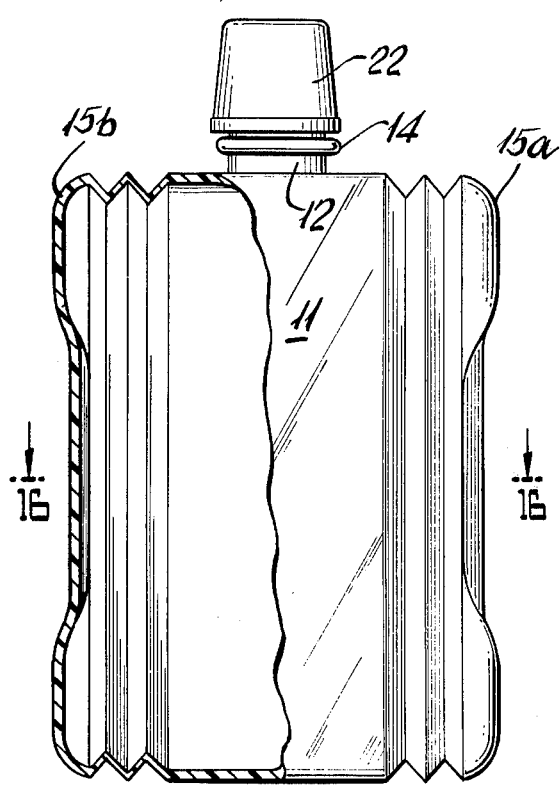
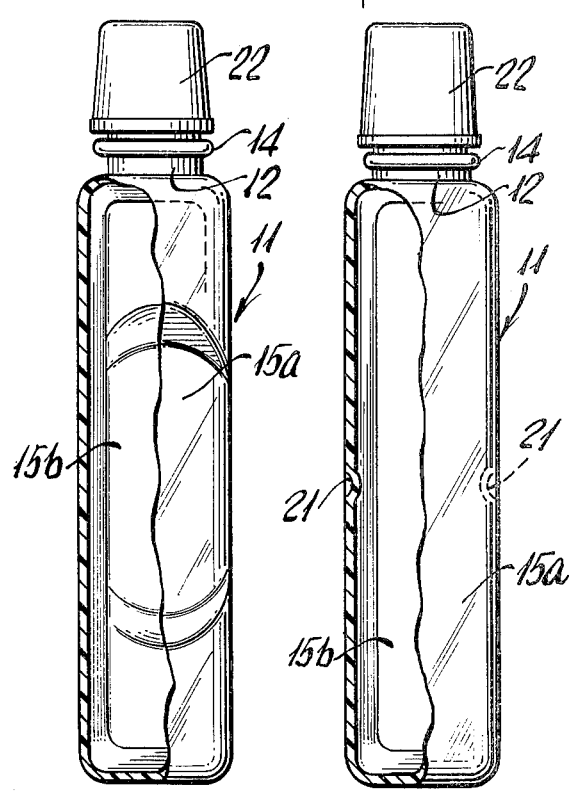
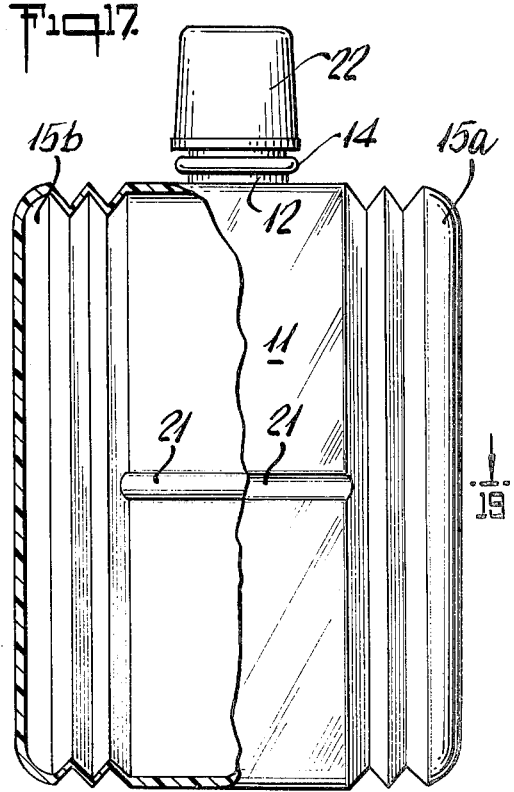

SQUEEZE BOTTLE

BACKGROUND OF THE INVENTION

This invention relates to a squeeze bottle for dispensing a liquid, such as a nasal spray or other medicine. More particularly, it relates to a squeeze bottle for dispensing a predetermined amount of liquid as a uniform spray.

Squeeze bottles for dispensing nasal sprays are well known. Generally, such a bottle is made of plastic or another compressible material, has a spray unit in its neck portion, and is easily squeezed to dispense the medicament through the spray unit. However, it has been found that consumers do not always apply a uniform squeezing pressure to such bottles, which may cause the medicament to be dispensed unevenly or as a stream, rather than as a fine spray. Additionally, because such bottles are easily operated, they are more apt to be misused by children.

Squeeze bottles of the prior art, such as those disclosed in U.S. Pat. Nos. 3,936,334; 3,926,347; 3,587,937; 3,386,604; 3,223,289; and 3,118,572, incorporate various structures for solving these problems, but none utilize the construction of and operate in the same manner as do the squeeze bottles of the present invention.

SUMMARY OF THE INVENTION

A squeeze bottle is provided which includes a container and a shroud at least partially surrounding the container. The container has a neck portion through which product is dispensed from the bottle. A spray unit is disposed in the neck portion for dispensing the product. Portions of the container walls are bellowed and the shroud is compressible, so that by squeezing it the bellowed walls are compressed and product is dispensed.

Preferably, the shroud is compressible because it is made of two separate sections, each section surrounding a bellowed wall portion of the container and adapted to overlap with the other section when the shroud is squeezed. Most preferably, the edges of the shroud sections that overlap are provided with a mating groove and bead arrangement, which requires that a predetermined squeezing pressure be applied to the shroud before it will compress and cause product to be dispensed from the container. Additionally, means for locking one section to the other section to prevent compression of the shroud may be provided.

BRIEF DESCRIPTION OF THE DRAWINGS

The invention is best understood by reference to the detailed description thereof below and to the drawings herein, which are as follows:

FIG. 1 is a cutaway, cross-sectional view of a squeeze bottle of the present invention.

FIG. 2 is a similar view of the squeeze bottle of FIG. 1 showing the bottle after it has been squeezed.

FIG. 3 is a cross-sectional view along lines 3—3 of FIG. 1.

FIG. 4 is a prospective view of a different shroud useful in a squeeze bottle of the present invention showing the separate sections of the shroud before they are joined.

FIG. 5 is a similar view of the shroud of FIG. 4 showing the separate sections of the shroud after they are joined.

FIG. 6 is a cross-sectional view along lines 6—6 of FIG. 5.

FIG. 7 is a cross-sectional view along lines 7—7 of FIG. 5.

FIG. 8 is a perspective view of another shroud useful in a squeeze bottle of the present invention.

FIG. 9 is a cross-sectional view along lines 9—9 of FIG. 8.

FIG. 10 is a partial, cross-sectional view of an alternative mating bead and groove arrangement, similar to the arrangement shown in FIG. 3.

FIG. 11 is a view similar to that of FIG. 10.

FIG. 12 is another view similar to that of FIG. 10.

FIG. 13 is another view similar to that of FIG. 10.

FIG. 14 is a cutaway, cross-sectional view of a different container useful in a squeeze bottle of the present invention.

FIG. 15 is a side view of the container of FIG. 14.

FIG. 16 is a cross-sectional view along lines 16—16 of FIG. 14.

FIG. 17 is a cutaway, cross-sectional view of another container useful in a squeeze bottle of the present invention.

FIG. 18 is a side view of the container of FIG. 17.

FIG. 19 is a cross-sectional view along lines 19—19 of FIG. 17.

FIG. 20 is a top cross-sectional view, similar to FIG. 3, of another squeeze bottle of the present invention.

DESCRIPTION OF THE PREFERRED EMBODIMENTS

A squeeze bottle 10 of this invention is shown in FIG. 1. The bottle includes a container 11, which is preferably made from a resilient "spring memory" plastic, such as polypropylene or polyethylene. An opening (indicated at 13 in FIG. 3) in communication with the interior of container 11 is provided in the top of the container and a neck portion 12 covering the opening is also provided. For dispensing a liquid as a spray from the container, as will be discussed below, a spray unit (not shown) is disposed in neck portion 12. Preferably the neck portion and spray unit are covered by a cap when the bottle is not in use and, most preferably, the cap is hinged to the bottle in some manner so that it is not misplaced while the bottle is in use. As shown in FIG. 1, neck portion 12 is provided with a bead 14 over which a cap may be frictionally fit for being securely fastened to container 11.

Referring again to FIG. 1, portions of the walls of container 11, generally indicated at 15a and b, are bellowed for the reasons discussed below.

Surrounding the container is a shroud 16. The shroud is preferably made from a semi-rigid plastic, such as polystyrene, polyvinylchloride, or other thermoplastic material and is most preferably transparent, so that surface decoration on container 11 can be seen through the shroud. As best seen in FIGS. 1 and 3, the shroud is formed of two separate sections 16a and b. Section 16a generally surrounds bellowed wall portion 15a of container 11 and section 16b generally surrounds portion 15b, as best seen in FIG. 3.

The free edges of each section, indicated at 17a and b in FIG. 3, are joined by a mating bead and groove arrangement. That is, on the free edge of each section, a bead and groove is provided which mate with a corresponding groove and bead, respectively, on the free edge of the other section.

This mating bead and groove arrangement serves two functions in the bottle described thus far. First, it secures the two sections firmly together around container 11. Second, it provides a predetermined amount of resistance to overlap of sections 16a and b beyond the point where the free edges thereof overlap to form the mating arrangement and, consequently, prevents compression of the shroud, compression of the bellowed wall portions of container 11, and dispensing of product from the bottle.

To dispense liquid as a spray from the bottle, hand pressure is applied to the shroud in the manner indicated by the arrows in FIG. 2. If the pressure applied is sufficient to overcome the resistance provided by the mating bead and groove arrangement of the shroud sections, then the sections may substantially overlap, which causes bellowed portions 15a and b of container 11 to be compressed and liquid to be dispensed.

It has been found that preventing compression of the container, if an insufficient squeezing pressure is applied to the shroud, is beneficial for two purposes. First, as mentioned above, an insufficient squeezing pressure may lead to dispension of the liquid other than as a fine spray. By requiring that the squeezing pressure be great enough to overcome the mating bead and groove arrangement discussed above, the pressure application is generally great enough to insure a fine spray.

Second, by requiring a greater squeezing pressure for product dispension, which is preferably about 4 to 6 p.s.i.g., it is more difficult for a child to operate the bottle and dispense product for an unintended purpose.

For instance, in a bottle having a length and width of about 4.3 and 1.5 inches, respectively, it has been found that a groove depth of about 0.032 to 0.125 inches is effective for serving these above purposes. Also, such a bottle has been found to have a volume displacement, upon being squeezed hard enough to overcome this mating groove and bead arrangement, of about 30 to 50% of the container volume. Consequently, air return to the container after release of the bottle is immediate and in the range of about 5 to 7 p.s.i.g. due to the inherent spring action of the bellowed walls of the container, which must exceed the pressure initially required to dispense product.

Several mating bead and groove arrangements which can be employed in the bottles of this invention are illustrated in FIGS. 10-13. Particularly as shown in FIGS. 3 and 10, edges 17a and b of sections 16a and b can be tapered and radiused to prevent the bottle user's skin from being caught by the sections when the shroud is compressed.

Other embodiments of the bottle described thus far are illustrated in FIGS. 4-9 and 14-20. For instance, as shown in FIGS. 4 and 5, the shroud can be provided with a locking device which would require release by the bottle user before the shroud could be compressed. The locking device includes a clip 18 attached to section 16b of the shroud shown having an arm 19 adapted to fit into an opening 20 in section 16a. To operate a bottle having such a locking device, clip 18, as shown in FIG. 5, would have to be released from engagement with opening 20, as shown in FIG. 8. The shroud could also be provided with gripping surfaces, similar to those of a bicycle handle grip, to facilitate operation of the bottle.

As shown in FIG. 14, the container could be concave, at least in part, to also facilitate operation of the bottle. The provision of concavity in the container lessens the resistance to compression of the bellowed container and reduces the possibility of dimensional deformity of the container when it is compressed.

Further, the container can be provided with a horizontal groove 21, as shown in FIG. 17, which would mate with an abutment on the inner surface of the shroud to insure the correct registration of the shroud on the container. Alternatively, the shroud could be grooved and the container could be provided with such an abutment. Also, as shown in FIGS. 14 and 17, a cap 22 may be utilized for closing the container when it is not in use.

Another embodiment of the bottle of the present invention is shown in FIG. 20. In this bottle, the shroud is provided with cam surfaces 23, which act upon container 11 when shroud 16 is squeezed in the direction of the arrows shown. Compression of the shroud causes the container to deform in the manner shown, so that bellowed portions 15a and b of the container act as recovery springs when the bottle is released to return the shroud sections to their initial position.

The above description of bottles of the present invention is illustrative only and should not be interpreted as defining the scope of this invention, which is accomplished by the claims appended hereto.

What is claimed is:

1. A squeeze bottle comprising a container having a neck portion containing a spray unit and bellowed side walls
   (a) said bellowed side walls being adapted to be compressed inwardly to apply pressure to the contents of said container and to return to their normal position when the pressure is released;
   (b) shroud means encompassing at least a portion of each of said bellowed side walls, said shroud means comprising a pair of sections each having free inner margins disposed in overlapping relationship with respect to each other, each of said shroud sections being adapted to move inwardly when compressed and to apply pressure to said side bellowed walls; and
   (c) the overlapping portions of said shroud sections having bead and groove means disposed in mating relationship, said mating relationship being adapted to be released by a predetermined pressure applied inwardly to said shroud sections.

2. A squeeze bottle according to claim 1 in which each shroud section has a side wall and front and back walls.

3. A squeeze bottle according to claim 1 including releasible locking means for locking said shroud sections to each other.

* * * * *